(12) United States Patent
Kulkarni (10) Patent No.: US 8,255,391 B2
(45) Date of Patent: Aug. 28, 2012

(54) SYSTEM AND METHOD FOR GENERATING AN APPROXIMATION OF A SEARCH ENGINE RANKING ALGORITHM

(75) Inventor: Parashuram Kulkarni, New York, NY (US)

(73) Assignee: Conductor, Inc., New York, NY (US)

( * ) Notice: Subject to any disclaimer, the term of this patent is extended or adjusted under 35 U.S.C. 154(b) by 603 days.

(21) Appl. No.: 12/367,646

(22) Filed: Feb. 9, 2009

(65) Prior Publication Data

US 2010/0057718 A1    Mar. 4, 2010

Related U.S. Application Data

(60) Provisional application No. 61/093,586, filed on Sep. 2, 2008.

(51) Int. Cl.
*G06F 17/30* (2006.01)
(52) U.S. Cl. ........ 707/723; 707/706; 707/707; 707/748; 707/749; 707/769
(58) Field of Classification Search .................. 707/707, 707/723, 748, 749, 769, 706
See application file for complete search history.

(56) References Cited

U.S. PATENT DOCUMENTS

| | | | |
|---|---|---|---|
| 6,601,075 B1 | 7/2003 | Huang et al. | |
| 6,865,573 B1 | 3/2005 | Hornick et al. | |
| 7,831,685 B2 * | 11/2010 | Dai et al. | 709/217 |
| 2006/0218141 A1 | 9/2006 | Tuttle et al. | |
| 2008/0027925 A1 * | 1/2008 | Li et al. | 707/5 |
| 2008/0036787 A1 * | 2/2008 | Gelber | 345/619 |
| 2008/0172375 A1 * | 7/2008 | Burges et al. | 707/5 |
| 2008/0215561 A1 * | 9/2008 | Yu et al. | 707/5 |
| 2008/0260241 A1 * | 10/2008 | Ye et al. | 382/159 |
| 2008/0275833 A1 * | 11/2008 | Zhou et al. | 706/45 |
| 2009/0326916 A1 * | 12/2009 | Gao et al. | 704/4 |

OTHER PUBLICATIONS

PCT International Search Report PCT/ISA/210, Apr. 2007.
PCT Written Opinion of the International Searching Authority PCT/ISA/237, Apr. 2007.

* cited by examiner

*Primary Examiner* — John E Breene
*Assistant Examiner* — Andalib Lodhi
(74) *Attorney, Agent, or Firm* — Moritt Hock & Hamroff LLP; Steven S. Rubin, Esq.

(57) ABSTRACT

A system and method for determining a ranking function for a search engine. A training data processor receives training data, the training data including at least a first page, a first label, a second page and a second label. A feature extraction processor receives the first page, identifies first features in the first page and calculates first values relating to the first features. The feature extraction processor receives the second page and identifies second features and calculates second values relating to the second features. A machine learning processor receives the first features, the first values, the first label, the second features, the second values, and the second label. The machine learning processor generates a ranking function based on first features, the first values, the first label, the second features, the second values, and the second label.

15 Claims, 5 Drawing Sheets

SYSTEM AND METHOD FOR GENERATING AN APPROXIMATION OF A SEARCH ENGINE RANKING ALGORITHM

This application claims priority to U.S. Patent application Ser. No. 61/093,586 entitled "Techniques for Automated Search Rank Function, Approximation, Rank Improvement Recommendations and Predictions", filed Sep. 2, 2008, the entirety of which is hereby incorporated by reference.

BACKGROUND OF THE INVENTION

1. Field of the Invention

This disclosure relates to a system and method for generating an approximation of a search engine ranking algorithm.

2. Description of the Related Art

Figure 1:
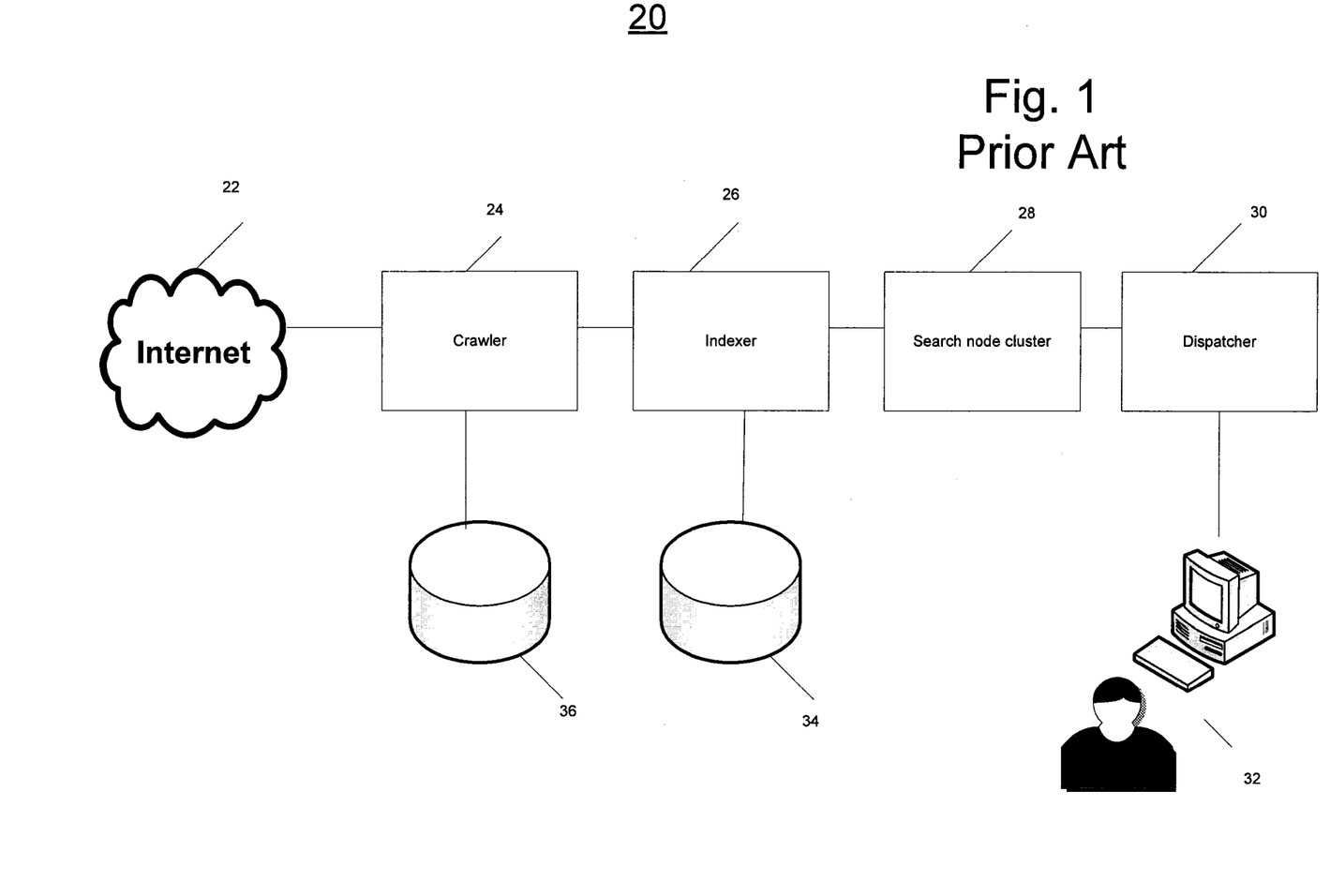
FIG. 1 is a system drawing a search engine in accordance with the prior art.

Referring to FIG. 1, the World Wide Web ("WWW") is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 sends a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function.

The ranking function is a function of the query itself and the type of page produced. Factors that are used for relevance include hundreds of features extracted, collected or identified for each page including: a static relevance score for the page such as link cardinality and page quality, superior parts of the page such as titles, metadata and page headers, authority of the page such as external references and the "level" of the references, the GOOGLE page rank algorithm, and page statistics such as query term frequency in the page, words on a page, global term frequency, term distances within the page, etc.

The use of search engines has become one of the most popular online activities with billions of searches being performed by users every month. Search engines are also a starting point for consumers for shopping and various day to day purchases and activities. With billions of dollars being spent by consumers online, it has become ever more important for web sites to organize and optimize their web pages in an effort to be more visible and accessible to users of a search engine.

As discussed above, for each web page, hundreds of features are extracted and a ranking function is applied to those features to produce a ranking score. A merchant with a web page would like his page to be ranked higher in a result set based on relevant search keywords compared with web pages of his competitor for the same keywords. For example, for a merchant selling telephones, that merchant would like his web page to acquire a higher ranking score, and appear higher in a result set produced by a search engine, based on the keyword query "telephone" than the ranking scores of web sites of his competitors for the same keyword. There are some prior art solutions available to guess the ranking algorithm used by a search engine and to provide recommendations about improvements that can be made to web pages so that the ranking score for a web page relating to particular keywords may improve. However, most of these systems use manual, human judgment and historical knowledge about search engines. Humans must be trained to perform this analysis. The basis for these judgments are mostly guesses or arrived at by trial and error. Consequently, most prior art solutions are inaccurate, time consuming, and require expensive human capital. Moreover, these solutions are available only for specific search engines and are not immune to changes in search or ranking algorithms used by known search engines nor do they have the ability to adapt to new search engines.

SUMMARY OF THE INVENTION

One embodiment of the invention is a method for approximating a ranking function of a search engine. The method comprises receiving training data, the training data including at least a first page, a first label, a second page and a second label; and receiving the first page at a feature extraction processor, the feature extraction processor effective to identify first features in the first page and calculate first values relating to the first features. The method further comprises receiving the second page at the feature extraction processor, the feature extraction processor effective to identify second features and calculate second values relating to the second features; receiving the first features, the first values, the first label, the second features, the second values, and the second label at a machine learning processor; and generating a ranking function at the machine learning processor based on first features, the first values, the first label, the second features, the second values, and the second label.

Another embodiment of the invention is a system for approximating a ranking function of a search engine. The system comprises a first database including training data, the training data including at least a first page, a first label, a second page and a second label; and a feature extraction processor connected to the first database, the feature extraction processor effective to receive the first page and to identify first features and calculate first values relating to the first features, the feature extraction processor further effective to receive the second page and to identify second features and calculate second values relating to the second page. The system further comprises a machine learning processor connected to the first database and to the feature extraction server, the machine learning processor effective to receive the first features, the first values, the first label, the second features, the second values, and the second label, the machine learning processor further effective to generate a ranking function based on the first features, the first values, the first label, the second features, the second values, and the second label.

Yet another embodiment of the invention is an approximation of a ranking function for a search engine produced by the process of receiving training data, the training data including at least a first page, a first label, a second page and a second label; and receiving the first page at a feature extraction processor, the feature extraction processor effective to identify first features in the first page and calculate first values relating to the first features. The process further includes receiving the second page at the feature extraction processor, the feature extraction processor effective to identify second features and calculate second values relating to the second features; receiving the first features, the first values, the first label, the second features, the second values, and the second label at a machine learning processor; and generating a ranking function at the machine learning processor based on first features, the first values, the first label, the second features, the second values, and the second label.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

When applying a ranking function, search engines receive as input: 1) at least one keyword and 2) a plurality of web pages in a result set produced based on the keyword(s). With those inputs, the search engine produces as an output a ranking score for each web page. The inventors recognized this phenomenon and produced a system and algorithm to reverse engineer the function performed by search engines to produce that output. Stated another way, search engines perform the following ranking function to generate a ranking score for each page in a result set:

ranking score=F(input)

where the input is the search query in the form of keyword(s) and extracted features of the pages in the result set.

In order to approximate the ranking function, training data may be sent to a machine learning system. Generating such training data is perhaps the most difficult and labor intensive part of any machine learning system. As discussed above, prior art techniques for generating training data include the use of teams of humans subjectively viewing selected portions of available data such as keywords and result sets. Even if collection of data may be automated, in the prior art, labeling of the data is performed manually. Such labeling techniques are often inaccurate as they are subject to human judgment of a complex system such as a search engine. A human being typically cannot judge by intuition whether he has collected all kinds of different search results to ensure that the training data is diverse and it is generally not possible to manually track or generate a diverse set of data. A diverse training set is desired for a machine learning algorithm to work well. Moreover, human labeling in not accurate because it is generally not possible to judge a label value by intuition.

Figure 2:
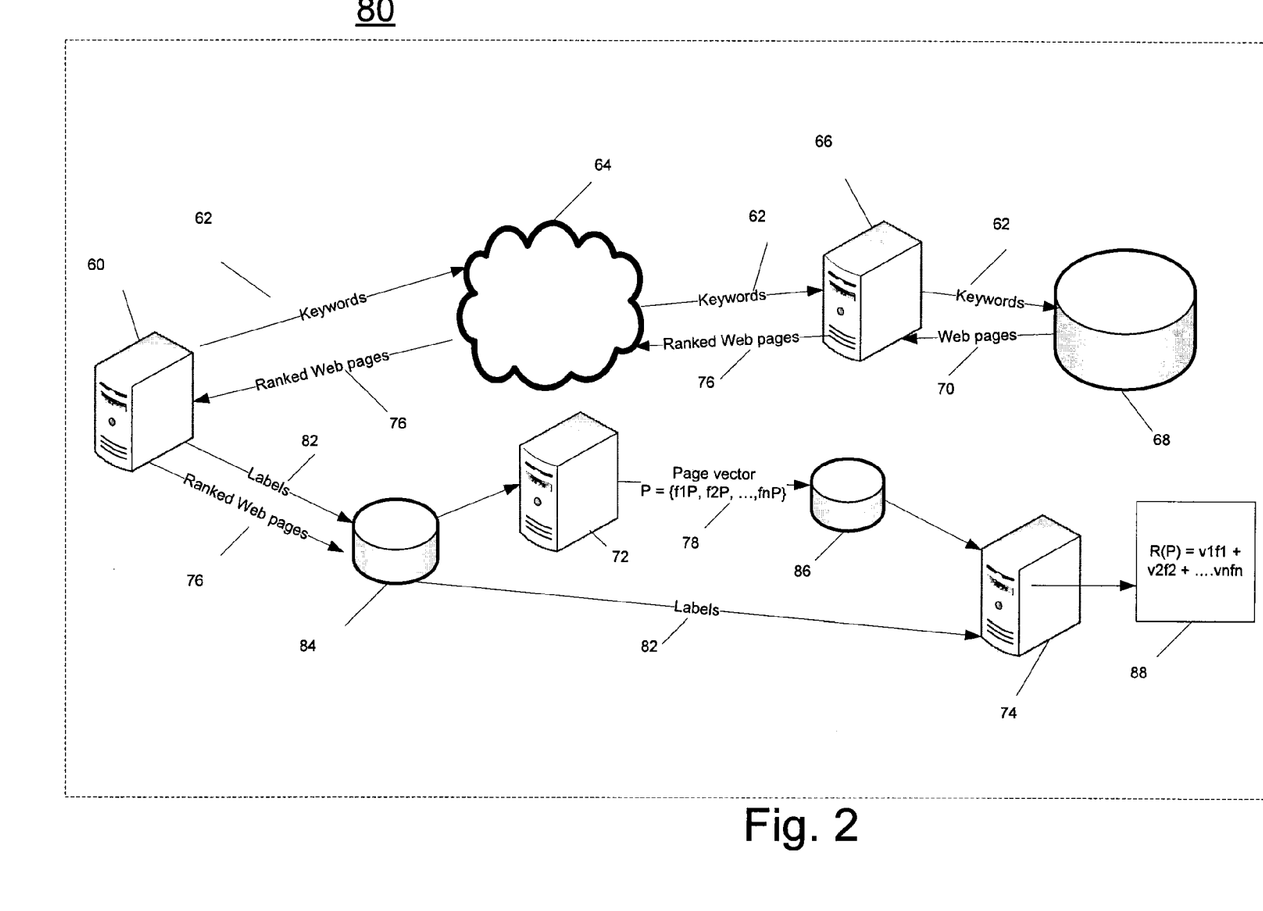
FIG. 2 is a system drawing of system for generating an approximation of a ranking algorithm in accordance with an embodiment of the invention.

Referring to FIG. 2, there is shown a system 80 in accordance with an embodiment of the invention. System 80 includes a training data generator server 60. Training data generator server or processor 60 sends keywords 62 over a network 64 (such as the Internet) to a search engine server 66. Keywords 62 could be virtually any set of keywords that, when input to a search engine, yield web pages in a result set. It is desirable to generate a number of different sets of keywords. Many techniques could be used to generate such sets. For example, keyword tools provided by search engines such as the MSN Keyword tool, or the GOOGLE ADWORDs tool could be used, third party tools which monitor and collect keywords based on popularity usage and other metrics may be used, or statistical analysis may be used to determine important keywords from web pages and web logs. For example, by collecting the frequency distribution of keywords from web pages and web logs, it may be possible to identify important keywords from pages. Keywords 62 are sent by search engine server 66 to a search engine index 68.

Search engine index 68 outputs web pages 70 that are responsive to a search query including keywords 62. Search engine server 66 receives web pages 70 and orders or ranks web pages 70 based on an unknown ranking algorithm to produce ranked web pages 76.

Ranked web pages 76 are sent over network 64 and fed to training data generator server 60. Training data generator server 60 stores ranked web pages 76 and labels 82 for those pages in a training data storage 84. A label 82 is associated with each ranked web page 76 corresponding to the rank of the ranked web page 76 based on keyword 62. The inventors have determined that a linear distribution of the ranking scores is a good representation of those scores. Consequently, if L ranked web pages 76 are considered, the highest ranked web page is given a label L, the second highest is given a label L-1, etc.

A feature extraction engine 72 receives web pages 76 and labels 82 from training data storage 84, and extracts values for defined features in ranked web pages 76. Search engines generate a ranking score and rank pages based on values of certain features. Those features include, for example, features used in the GOOGLE page rank algorithm (such as the links pointing to the page and links in the page pointing somewhere else), the size of the web page, the number of matches between the web page and keywords 62, etc.

The features may be derived from the content and structure of HTML documents. For example the kinds of features extracted may relate to: keyword frequency in Title tag of HTML documents, keyword frequency in metatags of HTML documents, keyword frequency in the body of HTML documents, keyword frequency in anchor text of in-links to a HTML document, number of back links of a HTML document, or distribution of back links of HTML documents.

If n features are extracted from ranked web pages 76, then each page P may be represented as a page vector 78 P={f1P, f2P, . . . fnP} where fnP is the nth feature of page P.

For example, if 100 ranked web pages 76 are considered, and 6 features are extracted, feature extraction server 72 will produce 100 page vectors 78, labeled 100 to 1, where page 100 would have the form P(100)={f1100, f2100, f3100, f4100, f5100, f6100} where f1, f2, f3, f4, f5 and f6 would have values corresponding to those respective features. For example, if f1 corresponds to the number of keyword matches, and if page 100 has 10 words that match keywords 62, f1 may have a value of 10.

Figure 3:
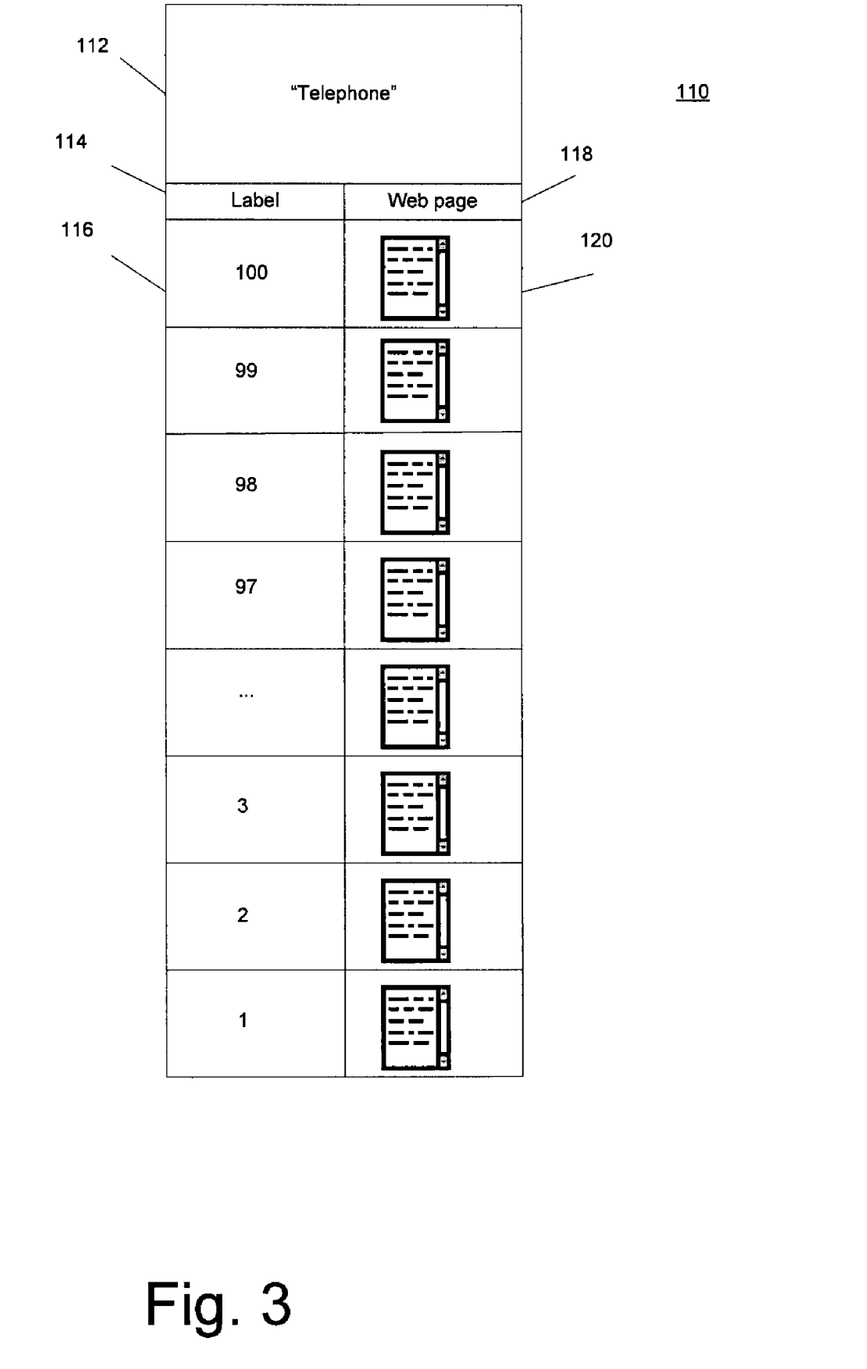
FIG. 3 is schematic drawing of a database structure in accordance with an embodiment of the invention.

Referring to FIG. 3, there is shown an example of a training data structure 110 which may be stored in training data storage 84. As shown, for a keyword 112 ("telephone" is shown) training data structure 110 may include a label column 114 and a web page column 118. Label column 114 includes labels 116 for ranked web pages 76 (FIG. 2). The web pages themselves may be stored in web page column 118. The contents of training data structure 110 may be used as training data in machine learning server 74 (discussed below).

Figure 4:
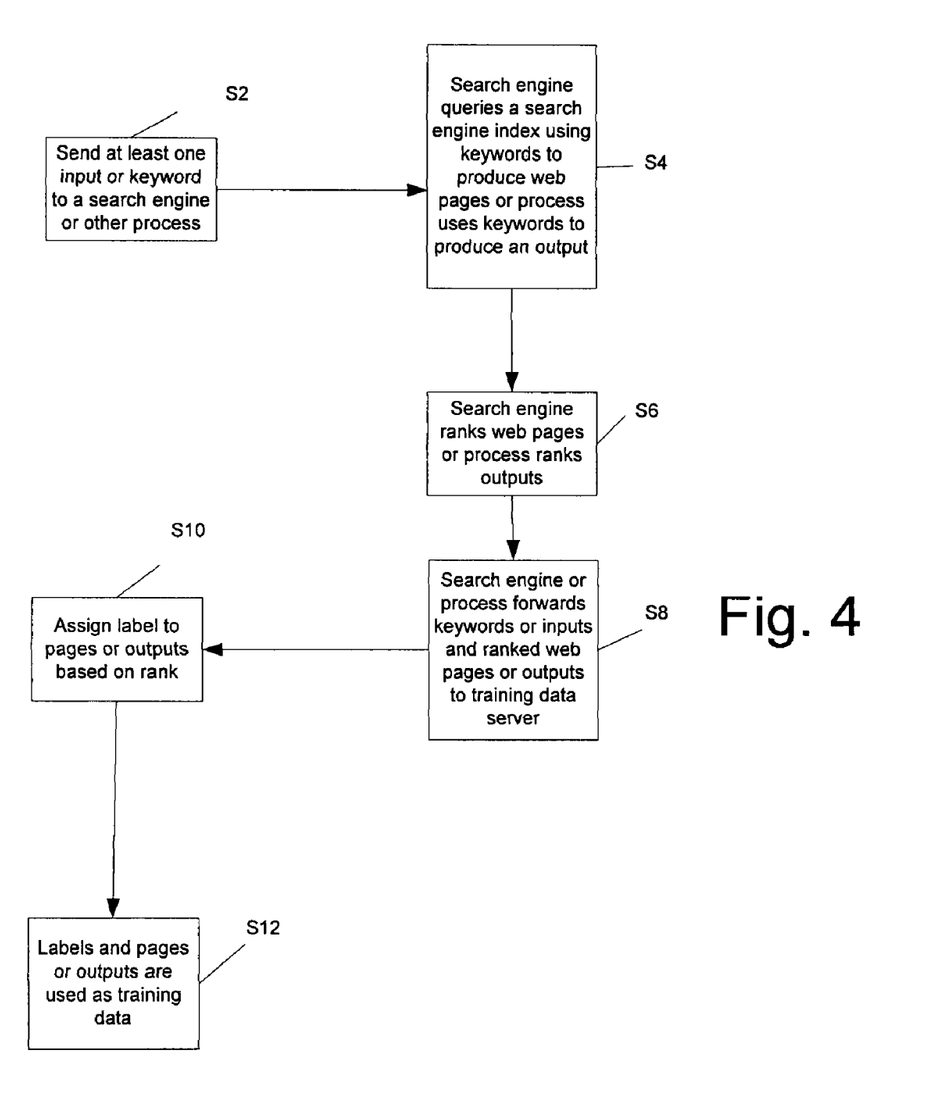
FIG. 4 is a flow chart of a process which could be used in accordance with an embodiment of the invention.

Referring to FIG. 4, there is shown a flow chart of a process which could be used to implement a process in accordance with an embodiment of the invention. The process could be used with, for example, system 80 described with respect to FIG. 2. As shown at step S2, at least one input or keyword is sent to a search engine or any other system implementing a process. At step S4, the search engine queries a search engine index using the keyword to produce a result set including web pages, or the process uses the keywords as input to produce an output. At step S6, the search engine ranks the web pages, or the process ranks the outputs. At step S8, the search engine or process forwards the inputs or keywords and ranked web pages or output to a training data server or processor. At step S10, the training data server or processor assigns a label to each page or output based on the rank. At step S12, the labels and pages or outputs are used as training data.

Figure 5:
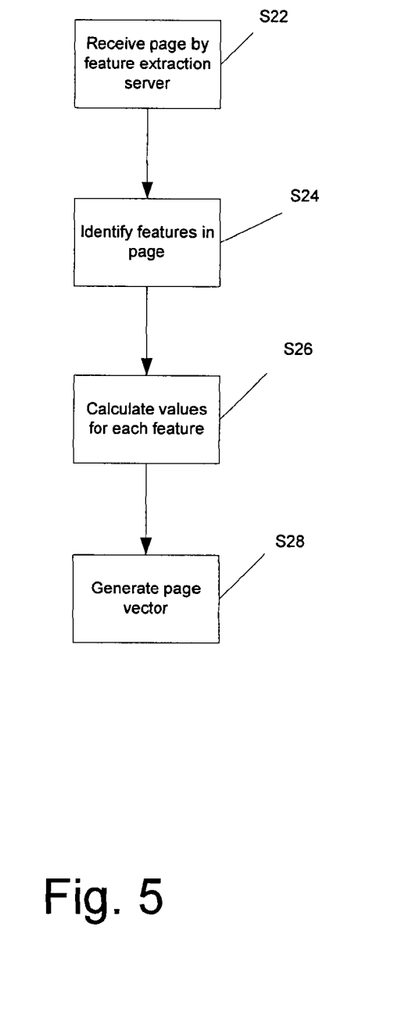
FIG. 5 is a flow chart of a process which could be used in accordance with an embodiment of the invention.

Referring to FIG. 5, there is shown a flow chart of a process which could be used in accordance with an embodiment of the invention. The process shown in FIG. 5 could be used with, for example, system 80 described above with reference to FIG. 2. As shown, at step S22, a web page is received by a feature extraction server. At step S24, features in the page are identified. At step S26, values are calculated for each feature. At step S28, a page vector is generated including the values for each feature.

Referring again to FIG. 2, feature extraction server 72 stores page vectors 78 in a feature storage 86. A machine learning server or processor 74 may receive page vectors 78 from feature storage 86 and labels 82 from training data storage 84, and use page vectors 78 and labels 82 as training data. Machine learning server 74 applies a machine learning algorithm to page vectors 78 and labels 82 to produce an approximated ranking function 88.

Machine learning server 74 may use any known machine learning techniques on training data to produce an approximated ranking function 88 for a search engine of interest. Although a specific algorithm is disclosed to produce training data, any training data may be used. More specifically, as described above, machine learning server 74 receives page vectors 78 stored in feature storage 86 and labels 82 stored in training data storage 84. Machine learning server 74 then applies a known machine learning algorithm using, for example, boosted decision trees, support vector machines, bayesian learners, any other algorithm, or a combination of these techniques, to calculate an approximated ranking function 88 which is an approximation of the ranking algorithm used by search engine server 66 to score and rank web pages 70. Approximated ranking function 88 for a page P will have the form $R(P) = v1f1 + v2f2 + \ldots vnfn$, where vnfn is a weight assigned to the nth feature of a page of interest. For example, v1 could have a value of 0.5 and v2 could have a value of 0.25 indicating that in the approximated ranking function 88, feature f1 is given twice the amount of weight as feature f2.

Machine learning server 74 may continually process page vector 78 and labels 82 using many different machine learning algorithms to calculate approximated ranking function 88. For example, machine learning server 74 may calculate a set of three different possible approximated ranking functions, and in one particular function a combination of values v results in ranking scores R(P) for pages matching labels 82 of ranked web pages 76 80% of the time. That particular function may be assigned as the approximated ranking function 88.

Approximated ranking function 88 need not be the same as the actual ranking algorithm used by search engine server 66 to be of significant value. For example, the GOOGLE search engine may assign different weights to different features than those assigned by machine learning server 74. In fact, machine learning server 74 may identify new patterns and/or useful features not currently appreciated by known search engines. However, as the inputs to machine learning server 74 (e.g. page vectors 78 and labels 82) are the outputs of a search engine of interest, approximated ranking function 88 yields a valuable result.

Figure 6:
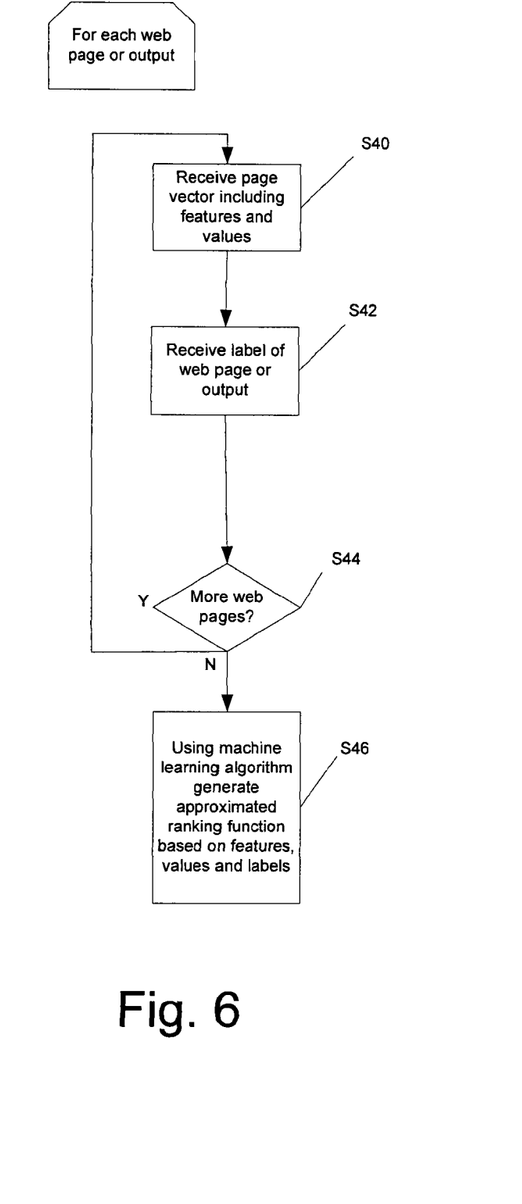
FIG. 6 is a flow chart of a process which could be used in accordance with an embodiment of the invention.

Referring to FIG. 6, there is shown a flow chart of a process which could be used in accordance with the invention. The process shown in FIG. 6 could be used with, for example, system 80 described above with reference to FIG. 2. As shown, at step S40, for each web page or output, a machine learning server or processor receives a page vector including features and values. At step S42, the machine learning server receives labels for each of the pages or outputs indicating how well each page corresponds to a particular keyword or input. At step S44, a query is made as to whether there are more web pages or outputs to process. If the answer to query S44 is yes, control branches back to step S40. If the answer to query S44 is no, control branches to step S46. At step S46, the machine learning server uses a machine learning algorithm to generate an approximated ranking function based on the features, values and labels. Ranking function 88 may be used to evaluate how well a particular web page would rank in a result set based on a keyword in a search engine of interest.

Clearly, although different servers are shown for various elements such as the training data server, and the feature extraction server, those servers could be combined in a single processor, housing or location.

A system in accordance with that described above can be used to collect training data on any search engine. Moreover, the system can adapt automatically to changes in ranking functions of existing search engines and produce new training data accordingly. Prior art systems are significantly limited in that subjective, expensive human capital is used to analyze only samples of available data. A system in accordance with the invention could analyze one page or thousands of pages easily and efficiently.

As can be discerned, the system and process described above is more accurate than human labeling because, in part, results of an unknown process such as search engine ranking are used. As the system is automated, it is possible to easily collect large amounts of training data without manual intervention. The use of automated labeling further eliminates the need for manual intervention. Learning algorithms produced in accordance with the invention are change resistant. This is because training data is based on search results. If any search engine changes its ranking algorithm the results will change and the training data will change. Prior art systems based on intuition and prior knowledge of humans cannot adapt as easily. The system works with known and to be developed search engines and can easily be applied to specific sites such as, for example, TRAVELOCITY.COM.

The invention has been described with reference to an embodiment that illustrates the principles of the invention and is not meant to limit the scope of the invention. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof. Various changes may be made without departing from the spirit and scope of the invention.

What is claimed is:

1. A method for approximating a ranking function of a search engine, the method comprising:
   receiving training data, the training data including at least a first web page, a first label, a second web page and a second label, wherein the first label is based on a first rank generated by a search engine for the first web page in response to a first keyword, and the second label is based on a second rank generated by the search engine for the second web page in response to a second keyword;
   receiving the first web page at a feature extraction processor, the feature extraction processor effective to identify first features in the first web page and calculate first values relating to the first features;
   receiving the second web page at the feature extraction processor, the feature extraction processor effective to identify second features in the second web page and calculate second values relating to the second features;
   receiving the first features, the first values, the first label, the second features, the second values, and the second label at a machine learning processor; and
   determining a ranking function approximating a ranking function used by the search engine, at the machine learning processor based on the first features, the first values, the first label, the second features, the second values, and the second label, wherein the ranking function includes respective weights for the first features and for the second features;
   at least some the respective weights for the first and second features are different than values assigned to the first and second features by the ranking function used by the search engine.

2. The method as recited in claim 1, wherein:
   the first label is related to a first rank of the first web page based on the first keyword input to the search engine; and
   the second label is related to a second rank of the second web page based on the second keyword input to the search engine.

3. The method as recited in claim 1, wherein the first and second web pages are received from the search engine in response to the first and the second keyword.

4. The method as recited in claim 1, wherein determining the ranking function is performed using at least one of a boosted decision tree, a support vector machine, and a bayesian learner.

5. The method as recited in claim 4, wherein determining the ranking function is performed using a combination of the boosted decision tree, the support vector machine, and the bayesian learner.

6. A system effective to approximate a ranking function of a search engine, the system comprising:
   a first database including training data, the training data including at least a first web page, a first label, a second web page and a second label;
   a feature extraction processor connected to the first database, the feature extraction processor effective to receive the first web page and to identify first features and calculate first values relating to the first features, the feature extraction processor further effective to receive the second web page and to identify second features and calculate second values relating to the second features, wherein the first label is based on a first rank generated by a search engine for the first web page in response to a first keyword, and the second label is based on a second rank generated by the search engine for the second web page in response to a second keyword; and
   a machine learning processor connected to the first database and to the feature extraction processor, the machine learning processor effective to receive the first features, the first values, the first label, the second features, the second values, and the second label, the machine learning processor further effective to determine a ranking function based on the first features, the first values, the first label, the second features, the second values, and the second label, the ranking function approximating a ranking function used by the search engine, wherein the ranking function includes respective weights for the first features and for the second features;
   at least some the respective weights for the first and second features are different than values assigned to the first and the second features by the ranking function used by the search engine.

7. The system as recited in claim 6, wherein:
   the first label is related to a first rank of the first web page based on the first keyword input to the search engine; and
   the second label is related to a second rank of the web second page based on the second keyword input to the search engine.

8. The system as recited in claim 6, wherein the first and second web pages are received from the search engine in response to the first and the second keywords.

9. The system as recited in claim 6, wherein the machine learning processor is effective to determine the ranking function using at least one of a boosted decision tree, a support vector machine, and a bayesian learner.

10. The system as recited in claim 9, wherein the machine learning processor is effective to determine the ranking function using a combination of the boosted decision tree, the support vector machine, and the bayesian learner.

11. An approximation of a ranking function for a search engine produced by the process of:
   receiving training data, the training data including at least a first web page, a first label, a second web page and a second label, wherein the first label is based on a first rank generated by a search engine for the first web page in response to a first keyword, and the second label is based on a second rank generated by the search engine for the second web page in response to a second keyword;
   receiving the first web page at a feature extraction processor, the feature extraction processor effective to identify first features in the first web page and calculate first values relating to the first features;
   receiving the second web page at the feature extraction processor, the feature extraction processor effective to identify second features in the second web page and calculate second values relating to the second features;
   receiving the first features, the first values, the first label, the second features, the second values, and the second label at a machine learning processor; and determining a ranking function approximating a ranking function used by the search engine, at the machine learning processor based on first features, the first values, the first label, the second features, the second values, and the second label, wherein the ranking function includes respective weights for the first features and for the second features;

at least some the respective weights for the first and second features are different than values assigned to the first and the second features by the ranking function used by the search engine.

12. The ranking function as recited in claim 11, wherein:

the first label is related to a first rank of the first web page based on the first keyword input to the search engine; and the second label is related to a second rank of the second web page based on the second keyword input to the search engine.

13. The ranking function as recited in claim 11, wherein the first and second web pages are received from the search engine in response to the first and the second keyword.

14. The ranking function as recited in claim 11, wherein determining the ranking function is performed using at least one of a boosted decision tree, a support vector machine, and a bayesian learner.

15. The ranking function as recited in claim 14, wherein determining the ranking function is performed using a combination of the boosted decision tree, the support vector machine, and the bayesian learner.

* * * * *